(12) United States Patent
Ohnari et al.

(10) Patent No.: US 11,091,376 B2
(45) Date of Patent: Aug. 17, 2021

(54) PLASMA GENERATOR AND HOME APPLIANCE HAVING THE SAME

(71) Applicant: Samsung Electronics Co., Ltd, Suwon-si (KR)

(72) Inventors: Hiroto Ohnari, Kanagawa (JP); Satoshi Yanase, Kanagawa (JP); Kazutoshi Takenoshita, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 16/171,870

(22) Filed: Oct. 26, 2018

(65) Prior Publication Data

US 2019/0127243 A1    May 2, 2019

(30) Foreign Application Priority Data

Oct. 27, 2017  (JP) .............................. JP2017-208477
Sep. 18, 2018  (KR) ......................... 10-2018-0111558

(51) Int. Cl.
*C02F 1/46* (2006.01)
*H05H 1/24* (2006.01)
(Continued)

(52) U.S. Cl.
CPC .............. *C02F 1/4608* (2013.01); *C02F 1/48* (2013.01); *H05H 1/2406* (2013.01); *H05H 1/48* (2013.01);
(Continued)

(58) Field of Classification Search
CPC .......... C02F 1/4608; C02F 1/48; C02F 1/722; C02F 2307/12; C02F 1/34; C02F 1/4606;
(Continued)

(56) References Cited

U.S. PATENT DOCUMENTS 3,429,809 A * 2/1969 Dotts, Jr. ................ C02F 1/465
                                                     204/571
2004/0007539 A1* 1/2004 Denes .................... C02F 1/4608
                                                     210/748.18
(Continued)

FOREIGN PATENT DOCUMENTS

EP           3134353 A1    3/2017
JP        2009216327 A    9/2009
(Continued)

OTHER PUBLICATIONS

International Search Report dated Apr. 17, 2019 in connection with International Patent Application No. PCT/KR2018/012852, 3 pages.
(Continued)

*Primary Examiner* — Xiuyu Tai

(57) ABSTRACT

Disclosed herein is a plasma generator capable of stably performing the discharge and an appliance having the same, wherein the plasma generator is configured to generate the discharge by plasma. The plasma generator includes a first case configured to store water to be treated; a second case disposed inside the first case and provided with a body having opposite sides opened, and a cover covering opened one side of the body; a first electrode disposed such that at least thereof is immersed in the water to be treated stored in the first case; and a second electrode disposed inside the second case. The second electrode is apart from a water surface of the water to be treated in an upper side of the water surface of the water to be treated in contact with opened other side of the body opposite to one side of the body.

19 Claims, 20 Drawing Sheets

(51) Int. Cl.
*C02F 1/48* (2006.01)
*H05H 1/48* (2006.01)
*C02F 1/72* (2006.01)

(52) U.S. Cl.
CPC .......... *C02F 1/722* (2013.01); *C02F 2307/12* (2013.01); *H05H 1/471* (2021.05)

(58) Field of Classification Search
CPC ........ C02F 2001/46133; C02F 2301/08; C02F 2303/04; C02F 2305/023; C02F 2305/10; C02F 2001/46138; C02F 1/46109; C02F 2301/046; C02F 2303/26; C02F 2001/46171; C02F 2201/4619; H05H 1/2406; H05H 1/48; H05H 1/471; H05H 1/30; H05H 1/50; H05H 1/36; H05H 1/44; B01J 19/088; B01J 19/08
See application file for complete search history.

(56) References Cited

U.S. PATENT DOCUMENTS

| | | | | |
|---|---|---|---|---|
| 2014/0110340 | A1* | 4/2014 | White | A61M 1/14 210/646 |
| 2015/0251935 | A1* | 9/2015 | Nishimura | B01F 5/0688 210/192 |
| 2015/0307370 | A1* | 10/2015 | Kang | C02F 1/4608 205/756 |
| 2017/0349456 | A1* | 12/2017 | Ohdou | C02F 1/001 |
| 2018/0153027 | A1* | 5/2018 | Iwanaga | H05H 1/30 |

FOREIGN PATENT DOCUMENTS

| | | | |
|---|---|---|---|
| JP | 2013-049015 | A | 3/2013 |
| JP | 2015-056407 | A | 3/2015 |
| JP | 5796174 | * | 10/2015 |
| KR | 10-2009-0105816 | A | 10/2009 |
| KR | 10-2014-0104359 | A | 8/2014 |
| WO | 2016/096751 | A1 | 6/2016 |

OTHER PUBLICATIONS

Written Opinion of the International Searching Authority dated Apr. 17, 2019 in connection with International Patent Application No. PCT/KR2018/012852, 5 pages.

Lukes et al., "Hydrogen Peroxide and Ozone Formation in Hybrid Gas-Liquid Electrical Discharge Reactors", IEEE Transactions on Industry Applications, vol. 40, No. 1, Jan. 1, 2004, 8 pages.

Lukes et al., "Generation of ozone by pulsed corona discharge over water surface in hybrid gas-liquid electrical discharge reactor", Institute of Physics Publishing, Feb. 7, 2005, 8 pages.

Supplementary European Search Report dated Sep. 28, 2020 in connection with European Patent Application No. 18 87 0753, 9 pages.

* cited by examiner

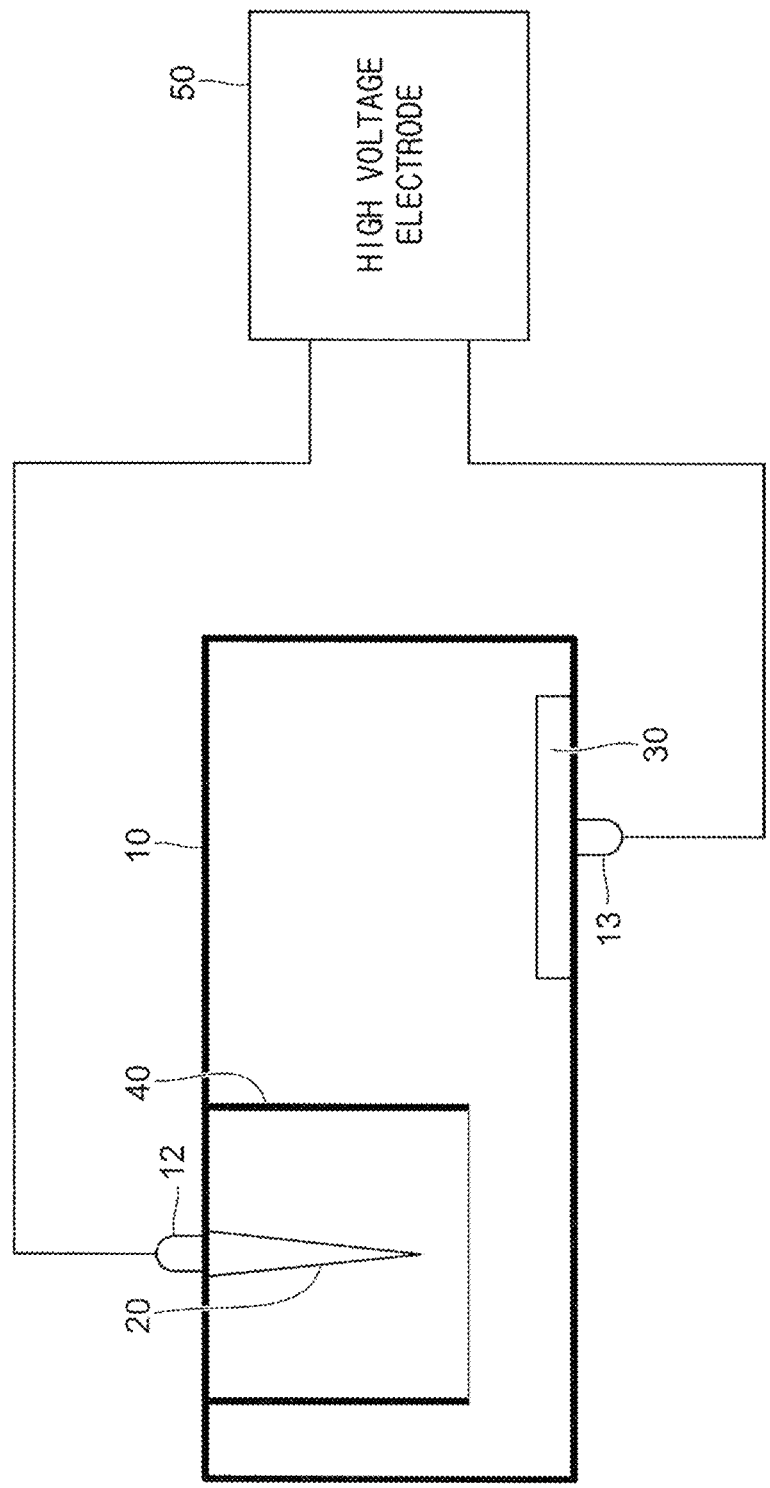

PLASMA GENERATOR AND HOME APPLIANCE HAVING THE SAME

CROSS-REFERENCE TO RELATED APPLICATIONS

This application is based on and claims priority under 35 U.S.C. § 119 to Japanese Patent Applications No. 2017-208477 filed on Oct. 27, 2017 in the Japan Intellectual Property Office and Korean Patent Application No. 10-2018-0111558 filed on Sep. 18, 2018 in the Korean intellectual Property Office, the disclosures of which are incorporated by reference herein in their entirety

BACKGROUND

1. Field

Embodiments of the present disclosure relate to a plasma generator and a home appliance having the same.

2. Description of Related Art

A humidifier is provided with a floating member floating on a surface of water or being immersed in the water that is stored in a storage tank, a discharge treatment device disposed on the upper side than the water surface of the storage tank while being installed on the floating member so as to perform the discharge to generate active species for purifying water, and a partitioning member partitioning the inside of the storage tank into a water supply region to which water is supplied and a discharge region in which the discharge treatment device is installed to perform the discharge, wherein the discharge treatment device is configured to perform the discharge toward the water surface while being moved in the vertical direction at a substantially regular interval from the water surface by being synchronized with the vertical movement of the floating member according to the increase or decrease of the water in the storage tank and the partitioning member is provided with a communication hole communicating with the water supply region and the discharge region.

As for a structure configured that a partial container such as a floating member floats on a surface of water in a container such as a storage tank and the discharge by the plasma is generated in the partial container, there is a difficulty in the performance of the stable discharge since waves on the water surface occur in the container when a device for generating the discharge by plasma is vibrated.

SUMMARY

Therefore, it is an aspect of the present disclosure to provide a plasma generator capable of stably performing the discharge although a vibration occurs thereon and an appliance having the same, wherein the plasma generator is configured to generate the discharge by plasma.

Additional aspects of the present disclosure will be set forth in part in the description which follows and, in part, will be obvious from the description, or may be learned by practice of the present disclosure.

In accordance with an aspect of the disclosure, a plasma generator includes a first case configured to store water to be treated; a second case disposed inside the first case and provided with a body having opposite sides opened, and a cover covering opened one side of the body; a first electrode disposed such that at least thereof is immersed in the water to be treated stored in the first case; and a second electrode disposed inside the second case. The second electrode is apart from a water surface of the water to be treated in an upper side of the water surface of the water to be treated in contact with opened other side of the body opposite to one side of the body.

A height of the water surface of the water to be treated in contact with the opened other side of the body of the second case may be lower than a height of a water surface of the water to be treated outside the body of the second case.

An end of the second electrode may be disposed lower than the water surface of the water to be treated outside the body of the second case.

At least one portion of the second case may be integrally formed with the first case.

The cover of the second case may be integrally formed with the first case.

The body of the second case may be integrally formed with the first case.

The second electrode may be coupled to the cover.

The first electrode may be disposed on a lower surface of the first case.

The first electrode may be disposed in a position that is not overlapped with the second case in a vertical direction.

The first electrode may be formed in a long rod shape that is coupled to an upper surface of the first case and extended in a vertical direction.

The plasma generator may further include a water supply pipe configured to supply water to be treated to the first case; an overflow pipe configured to adjust a height of water surface of the water to be treated stored in the first case; a discharge pipe configured to discharge the water to be treated stored in the first case to the outside of the first case; and a discharge valve disposed on the discharge pipe to regulate discharging of the water to be treated.

The plasma generator may further include an outer case spaced apart from the body to the outside of the body.

The second case may be movable between a first position that is not immersed in the water to be treated stored in the first case and a second position that is immersed in the water to be treated stored in the first case.

The first case may further include at least one rib disposed between the water supply pipe and the second case.

The at least one rib may be extended from the lower surface of the first case to the upper side.

The second case may be provided such that an inner space of the second case is closed by the water to be treated stored in the first case.

In accordance with an aspect of the disclosure, a home appliance includes a treatment apparatus configured to form a treatment space therein to store water to be treated; a plasma generator configured to generate hydrogen peroxide in the water to be treated by generating the discharge by plasma; and a pipe configured to guide the water to be treated containing hydrogen peroxide, to the treatment apparatus. The plasma generator includes a first case configured to store water to be treated; a second case disposed inside the first case; a first electrode disposed such that at least thereof is immersed in the water to be treated stored in the first case; and a second electrode installed inside the second case and configured to generate the discharge by the plasma between the second electrode and the water to be treated by being disposed in an upper side of a water surface of the water to be treated in contact with opened one side of the second case.

The second case may be provided such that an inner space of the second case is closed by the water to be treated stored in the first case.

In the first case, the second electrode may be disposed in the upper side than the first electrode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a view illustrating an electric circuit for generating the discharge by plasma in the plasma generator;

DETAILED DESCRIPTION

Figure 1A:
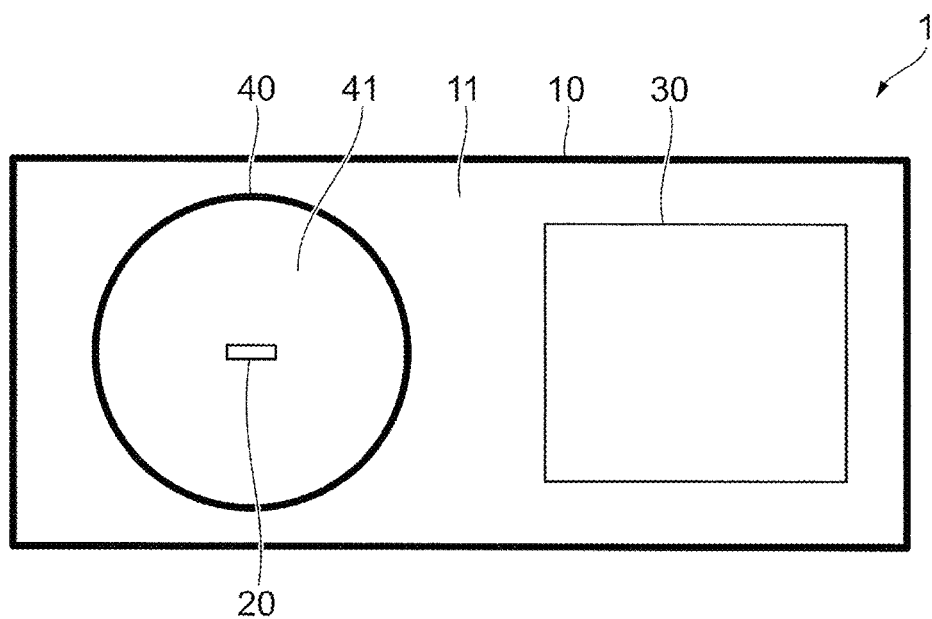
FIGS. 1A and 1B are views schematically illustrating a plasma generator according to an embodiment.

FIGS. 1A through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device The discharge may be generated by plasma when a high voltage is applied between electrodes having a constant distance.

As a first method, two electrodes are installed in water and a high voltage is applied. Accordingly, plasma is generated in bubbles generated in the water and thus hydrogen peroxide is generated.

In addition, as a second method, one electrode is installed in water (hereinafter referred to as "ground electrode"), and the other electrode is installed in the upper side than the water surface (hereinafter referred to as "high voltage electrode"). Accordingly, the discharge is generated by plasma between a tip of the high voltage electrode and the water surface so as to generate hydrogen peroxide.

The hydrogen peroxide produced by these methods can be used as a sterilizer. Hydroxyl radicals and oxygen radicals, which are generated by the decomposition of the hydrogen peroxide, have a strong oxidizing power so as to break down the cell structure of the microorganism, thereby performing a sterilizing action.

When there is no change in conditions, hydrogen peroxide may be decomposed into water and oxygen which are harmless. Therefore, the hydrogen peroxide does not remain as a harmful substance even when released into the environment and thus the hydrogen peroxide has been popular as an appropriate sterilizer having high environmental compatibility.

Plasma can be generated by using a pair of electrodes and a power source capable of applying a high voltage. This means that it is possible to implement a plasma generator with a simple configuration and low cost.

Since it is possible to generate hydrogen peroxide corresponding to the ideal sterilizer by using the plasma generator having the above mentioned characteristics, it is possible to process water using the plasma and to use the processed water as water for sterilizing.

Two methods for processing water for generating plasma have been described. With focusing on the generation of the hydrogen peroxide, as for the first method of generating hydrogen peroxide by generating plasma in bubbles in the water, a device is added for generating appropriate size bubbles in the water, in addition to electrodes. In addition, as needed, a device for supplying gas may be needed to the plasma generator. Further, the first method may have a risk of abrasion of electrode when the voltage for the generation of plasma is continuously applied for a long time.

According to the second method of generating hydrogen peroxide by performing a plasma discharge on the water surface, it is possible to implement a plasma generator having a simple structure and to generate the hydrogen peroxide at a low cost.

However, in the second method of generating hydrogen peroxide by generating plasma on the water surface, there are technical difficulties described as in the following.

When a distance between the tip of the high voltage electrode and the water surface is changed during the plasma discharge, it may be difficult to maintain the stability of the plasma and thus an amount of generated hydrogen peroxide may be changed. When the tip of the high voltage electrode is in contact with the water, the plasma discharge may be stopped.

Therefore, as for the plasma generator that is operated on the water surface, it may be needed to maintain the distance between the high voltage electrode and the water surface. The maintenance of distance may be more important in a case in which an appliance provided with the plasma generator has a risk of vibration.

For example, when the plasma generator is installed in home appliances such as a washing machine, a dishwasher, an air conditioner, an air purifier and a humidifier, the importance of maintenance of distance may be emphasized. Therefore, when the plasma generator is installed in the above mentioned home appliances, the distance between the high voltage and the water surface should be stabilized with higher precision.

Therefore, according to embodiments, a space around the high voltage electrode of the plasma generator may be maintained as a closed space by a part of a container and a water surface formed by water to be treated, and thus it may be possible to stably perform the plasma discharge although the plasma generator is continuously vibrated or the plasma generator is disposed at an inclination.

In addition, in order that gas, which is generated from the ground electrode during the plasma discharge, is prevented from flowing into the closed space in which the high voltage is disposed, the position of both electrodes are adjusted and the distance between the tip of the electrode, which is disposed on the upper side than the water surface, and the water surface is maintained between 1 mm to 5 mm, thereby stably performing the plasma discharge for a long time.

Figure 1B:
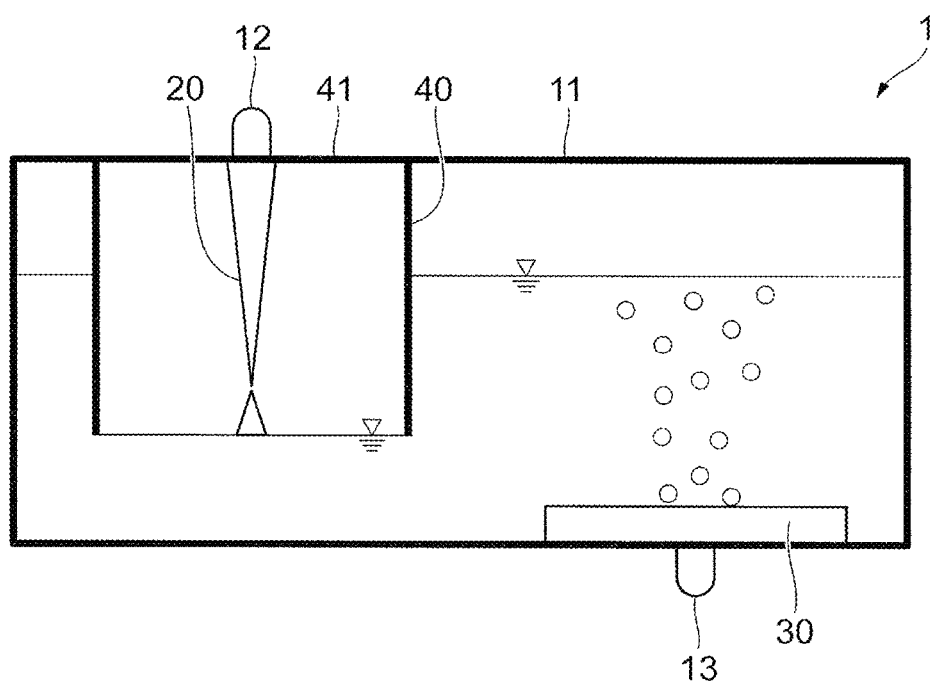

FIGS. 1A and 1B are views schematically illustrating a plasma generator 1 according to an embodiment. FIG. 1A is a top view of the plasma generator 1, and FIG. 1B is a cross-sectional view of the plasma generator 1.

As illustrated in FIGS. 1A and 1B, the plasma generator 1 includes a first case 10, a high-voltage electrode 20, a ground electrode 30 and a second case 40.

The first case 10 may be formed of transparent polycarbonate (PC) having a thickness of 3 mm.

The high-voltage electrode 20 may be formed of SUS304. Particularly, the high-voltage electrode 20 is formed in a wedge shape with a thickness of 0.3 mm and a tip thereof is formed in a needle shape for a stable discharge.

The ground electrode 30 may be formed of SUS304. Particularly, the ground electrode 30 is formed in a plane mesh having a size of 40 mm×40 mm and a thickness of 0.2 mm.

In addition, the high voltage electrode 20 and the ground electrode 30 may be formed of a material such as iron, stainless steel, or platinum.

The second case 40 corresponds to a case configured to maintain the high-voltage electrode 20 provided in the upper side than the water surface, at a closed state, and the second case 40 forms a part of the first case 10.

For example, the second case 40 is formed of polycarbonate (PC) having a thickness of 3 mm the same as a thickness of the first case 10, and formed in a shape of cylinder in which a height thereof is 10 mm, an inner diameter thereof is 35 mm, and an upper surface thereof and a lower surface thereof are open. An upper end of the cylinder is sealed with an upper cover 41 so as to support the high-voltage electrode 20. The upper cover 41 may form a part of an upper surface 11 of the first case 10.

The high-voltage electrode 20 is installed on the upper cover 41 such that the tip of the high-voltage electrode 20 is placed inside the second case 40 and an upper end of the second case 40 is connected to a tab 12.

According to an embodiment, the upper cover 41 of the second case 40 is configured to form a part of the upper surface 11 of the first case 10, but is not limited thereto.

For example, the first case 10 and the second case 40 may have a rectangular parallelepiped shape and at least one surface of the second case 40 may form a part of at least one surface of the first case 10 such as one side surface of the second case 40 may form a part of one side surface of the first case 10.

Alternatively, the second case 40 may be fixed to the first case 10. According to an embodiment, the second case 40 is provided as an example of a partial case, wherein the partial case is installed inside the case and fixed to the case and when water to be treated is stored in the case, the partial case is changed into the closed state by the water surface of the water to be treated.

For example, the amount of water to be treated contained in the first case 10 may be 0.1 L. Although not shown in FIGS. 1A and 1B, a water inlet configured to supply water to be treated and a water outlet configured to discharge water to be treated may be installed in the first case 10.

When the first case 10 is filled with water to be treated and the voltage is applied between the high voltage electrode 20 and the ground electrode 30, the discharge may occur between the high voltage electrode 20 and the surface of the water by the plasma, and thus hydrogen peroxide is generated in the water to be treated.

Figure 2:
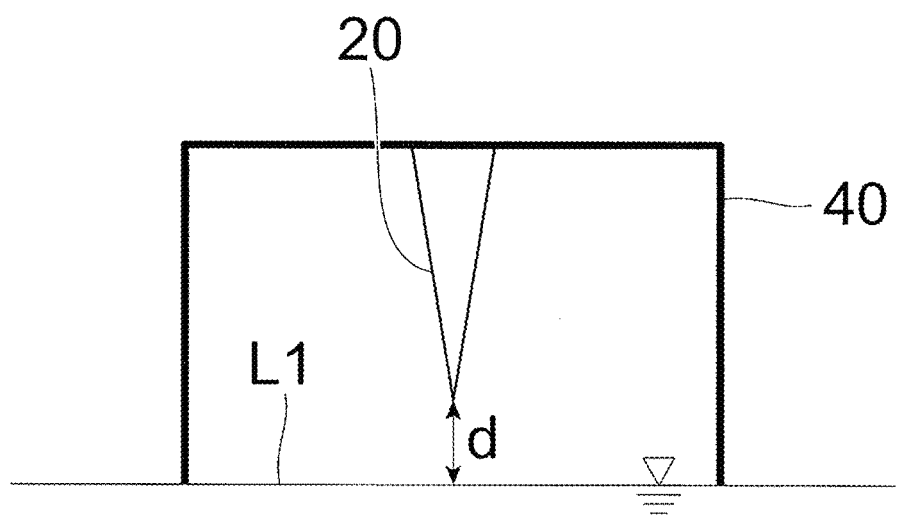
FIG. 2 is a view illustrating a relation between a second case and a water surface when water to be treated is supplied to a first case.

FIG. 2 is a view illustrating a relation between the second case 40 and the water surface when water to be treated is supplied to the first case 10.

As illustrated in FIG. 2, when the water to be treated is supplied to the first case 10, the water to be treated is in contact with a low end of the second case 40 and a first water surface (L1) is generated by the water to be treated. As mentioned above, when the inner diameter of the second case 40 has 35 mm, an area of the first water surface (L1) has 9.6 $cm^2$. In this state, the position of the high-voltage electrode 20 is adjusted to allow a distance (d) between the high voltage electrode 20 and the first water surface (L1) to be 3 mm.

According to an embodiment, the high-voltage electrode 20 is installed as an example of a first electrode, wherein the first electrode is disposed in the upper side than the water surface of the water to be treated in the partial case upon filling the water to be treated in the case.

Figure 3:
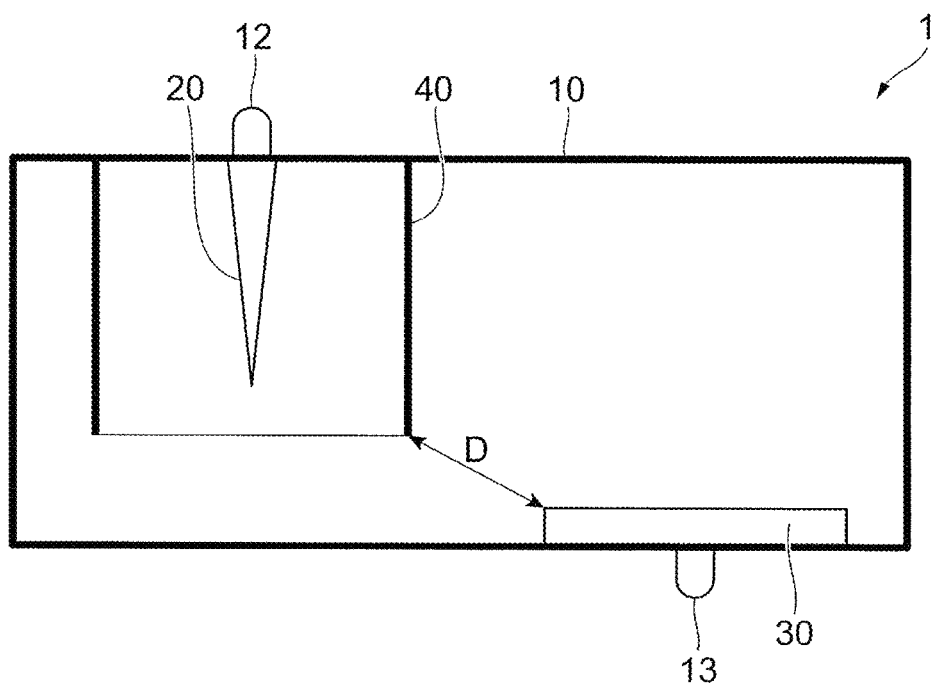
FIG. 3 is a view illustrating a relation among a ground electrode, the first case and the second case.

FIG. 3 is a view illustrating a relation among the first case 10, the ground electrode 30 and the second case 40.

As illustrated in FIG. 3, the ground electrode 30 is provided on the lower surface of the first case 10. The position of the ground electrode 30 is adjusted to prevent gas, which is generated from the ground electrode 30 during the plasma discharge, from flowing into the inside of the second case 40.

That is, the ground electrode 30 is disposed on the lower face of the first case 10 while the ground electrode 30 is disposed in a position that is not overlapped with the second case 40 in the up-and-down direction (vertical direction). For example, the ground electrode 30 may be disposed such that the shortest distance (D) between an end portion of the ground electrode 30 and an end portion of the second case 40 becomes 60 mm.

A part of the ground electrode 30 is connected to a tab 13 provided at the lower portion of the first case 10. According to an embodiment, the ground electrode 30 is installed as an example of a second electrode, wherein the second electrode is disposed to be immersed in the water to be treated upon filling the first case 10 with the water to be treated.

FIG. 4 is a view illustrating an electric circuit for generating the discharge by plasma in the plasma generator 1.

As illustrated in FIG. 4, the above mentioned tab 12 and tab 13 are connected to a high voltage power supply 50 for applying the voltage.

A process of generating hydrogen peroxide using the above-described plasma generator 1 and the result will be described.

Tap water corresponding to the water to be treated is input to the first case 10. The high-voltage electrode 20 and the ground electrode 30 are connected to a high voltage amplifier (e.g., model 5/80 by TREK, Inc.). In this case, a current is supplied with a pulse wave having a voltage of 2000 V, a current of 16 mA, and a frequency of 20 kHz.

After confirming that the discharge occurs by the plasma on the water through the transparent first case 10 upon applying the voltage, the discharge continues for one hour and then the application of the voltage is stopped after one hour.

When measuring a concentration of hydrogen peroxide in the water to be treated by using pack test of Kyoritsurikagaku, it is confirmed that the concentration of hydrogen peroxide is 130 ppm.

In addition, the first case 10 is fixed to a vibrator (e.g., a VORTEX-GENIE2 ® manufactured by scientific industry, Inc.) and a vibration corresponding to plasma generator 3 or 4 is applied for one hour while the current is supplied with the above mentioned conditions.

It is confirmed that the discharge occurs by the plasma on the water while the voltage is applied. In this case, the surface of the water is largely waved by the vibration, but the vibration is not stopped for one hour.

When measuring a concentration of hydrogen peroxide in the water to be treated by using pack test of Kyoritsurikagaku, it is confirmed that the concentration of hydrogen peroxide is 130 ppm.

That is, it is confirmed that the same amount of hydrogen peroxide is generated as that in the state in which the vibration is not applied.

Figure 5A:
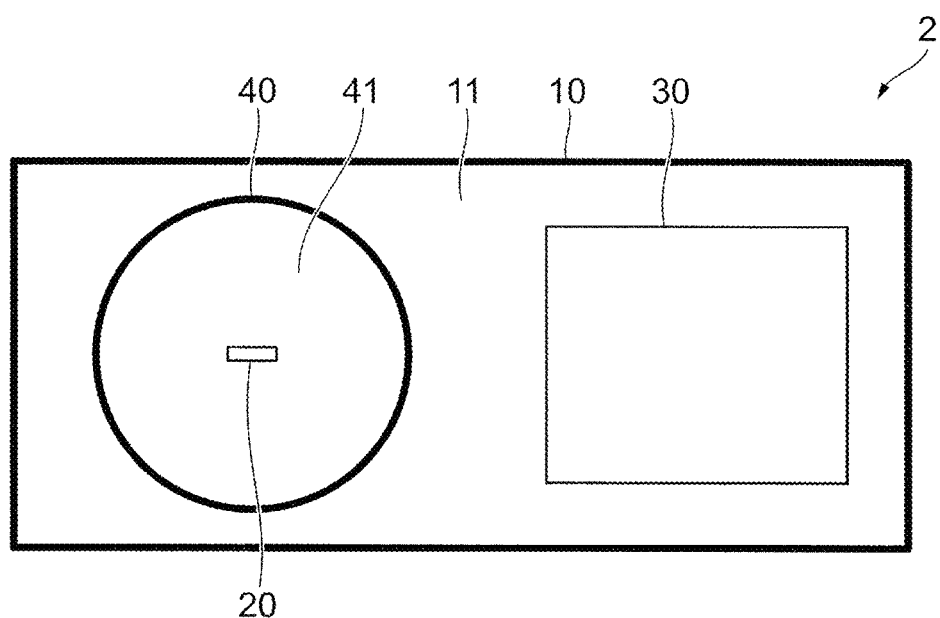
FIGS. 5A and 5B are views schematically illustrating a plasma generator according to an embodiment.
Figure 5B:
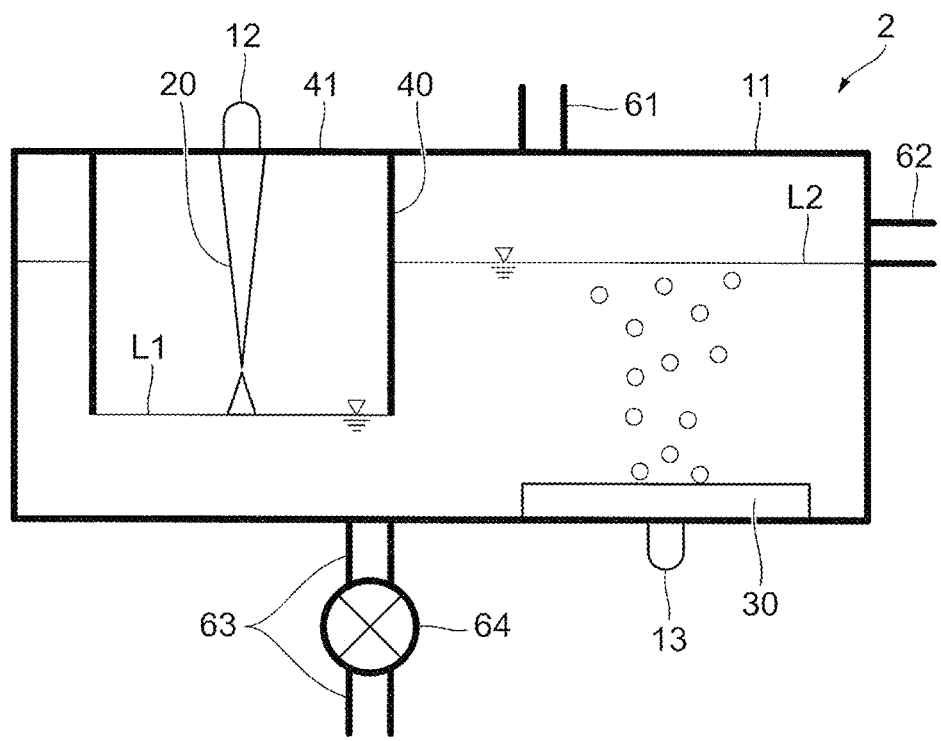

FIGS. 5A and 5B are views schematically illustrating a plasma generator 2 according to an embodiment. FIG. 5A is a top view of the plasma generator 2, and FIG. 5B is a cross-sectional view of the plasma generator 2.

As illustrated in FIGS. 5A and 5B, the plasma generator 2 includes a first case 10, a high-voltage electrode 20, a ground electrode 30, a second case 40, a water supply pipe 61, an overflow pipe 62, a discharge pipe 63, and a discharge valve 64.

The first case 10 may be formed of transparent polycarbonate (PC) having a thickness of 3 mm.

The high-voltage electrode 20 may be formed of SUS304. Particularly, the high-voltage electrode 20 is formed in a wedge shape with a thickness of 0.3 mm and a tip thereof is formed in a needle shape for a stable discharge.

The ground electrode 30 may be formed of SUS304. Particularly, the ground electrode 30 is formed in a plane mesh having a size of 40 mm×40 mm and a thickness of 0.2 mm.

In addition, the high voltage electrode 20 and the ground electrode 30 may be formed of a material such as iron, stainless steel, or platinum.

The second case 40 corresponds to a case configured to maintain the high-voltage electrode 20 provided in the upper side than the water surface, at a closed state, and the second case 40 forms a part of the first case 10.

For example, the second case 40 is formed of polycarbonate (PC) having a thickness of 3 mm the same as a thickness of the first case 10, and formed in a shape of cylinder in which a height thereof is 10 mm, an inner diameter thereof is 35 mm, and an upper surface thereof and a lower surface thereof are open. An upper end of the cylinder is sealed with an upper cover 41 so as to support the high-voltage electrode 20. The upper cover 41 may form a part of an upper surface 11 of the first case 10.

The high-voltage electrode 20 is installed on the upper cover 41 such that the tip of the high-voltage electrode 20 is placed inside the second case 40 and an upper end of the second case 40 is connected to a tab 12.

According to an embodiment, the upper cover 41 of the second case 40 is configured to form a part of the upper surface 11 of the first case 10, but is not limited thereto.

For example, the first case 10 and the second case 40 may have a rectangular parallelepiped shape and at least one surface of the second case 40 may form a part of at least one surface of the first case 10 such as one side surface of the second case 40 may form a part of one side surface of the first case 10.

Alternatively, the second case 40 may be fixed to the first case 10. According to an embodiment, the second case 40 is provided as an example of a partial case, wherein the partial case is installed inside the case and fixed to the case and when water to be treated is stored in the case, the partial case is changed into the closed state by the water surface of the water to be treated.

The water supply pipe 61 is provided on the upper surface of the first case 10 and configured to supply the water to be treated by a predetermined amount in a state in which the discharge valve 64 is closed.

The overflow pipe 62 is provided on the side surface of the first case 10 and configured to adjust a second water surface (L2) of the first case 10 at a constant water level by discharging the water to be treated at the same water level as the overflow pipe 62 in a state in which the discharge valve 64 is closed.

The discharge pipe 63 is provided on the lower surface of the first case 10, and configured to discharge the water to be treated containing hydrogen peroxide to the outside of the first case 10.

The discharge valve 64 discharges the water to be treated to the outside in an open state and prevents the water to be treated from being discharged to the outside in a closed state. For example, the discharge valve 64 is opened to discharge the water to be treated containing hydrogen peroxide so as to prevent the water to be treated from freezing due to a temperature around the first case 10.

For example, the amount of water to be treated contained in the first case 10 may be 0.1 L.

When the first case 10 is filled with water to be treated and the voltage is applied between the high voltage electrode 20 and the ground electrode 30, the discharge may occur between the high voltage electrode 20 and the surface of the water by the plasma, and thus hydrogen peroxide is generated in the water to be treated.

In addition, the features described with reference to FIGS. 2 to 4, and the method of generating hydrogen peroxide described in various other embodiments are also applied to this embodiment, and thus description thereof is omitted.

Figure 6A:
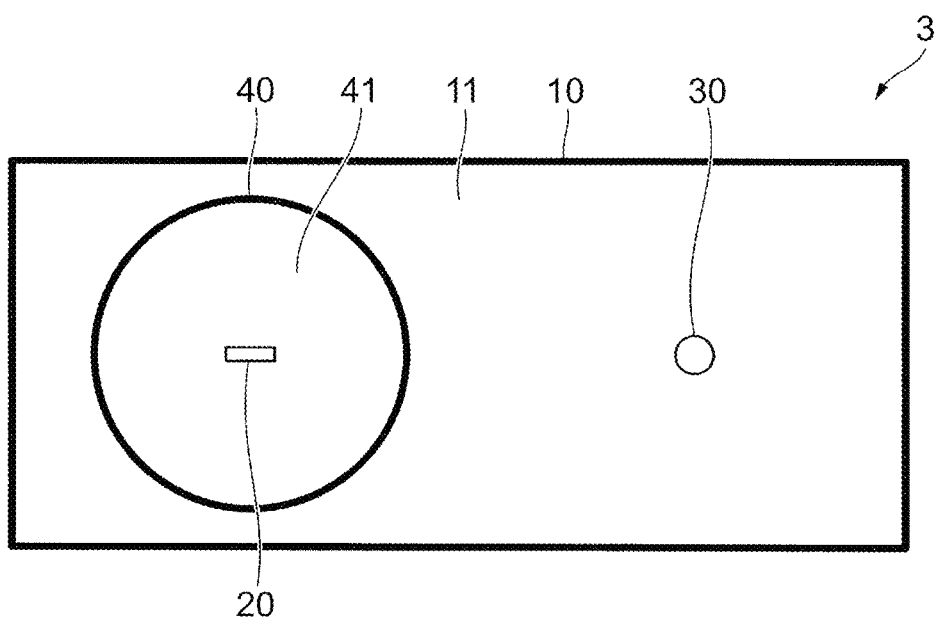
FIGS. 6A and 6B are views schematically illustrating a plasma generator according to an embodiment.
Figure 6B:
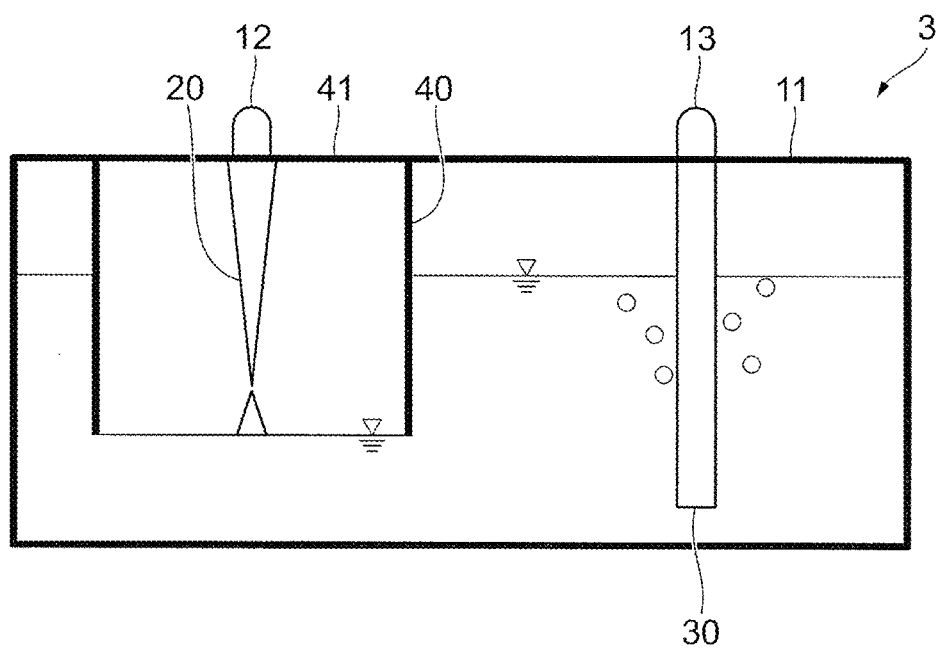

FIGS. 6A and 6B are views schematically illustrating a plasma generator 3 according to an embodiment. FIG. 6A is a top view of the plasma generator 3, and FIG. 6B is a cross-sectional view of the plasma generator 3.

As illustrated in FIGS. 6A and 6B, the plasma generator 3 includes a first case 10, a high-voltage electrode 20, a ground electrode 30, and a second case 40.

The first case 10 may be formed of transparent polycarbonate (PC) having a thickness of 3 mm.

The high-voltage electrode 20 may be formed of SUS304. Particularly, the high-voltage electrode 20 is formed in a wedge shape with a thickness of 0.3 mm and a tip thereof is formed in a needle shape for a stable discharge.

The ground electrode 30 may be formed of SUS304. Particularly, the ground electrode 30 is formed in a long rod shape in the vertical direction The high voltage electrode 20 and the ground electrode 30 may be formed of a material such as iron, stainless steel, or platinum. The ground electrode 30 is inserted into a part in which the second case 40 is not disposed on the upper surface 11 of the first case 10, and an end portion of the ground electrode 30 is disposed apart from the lower surface of the first case 10 by approximately 1 mm.

The second case 40 corresponds to a case configured to maintain the high-voltage electrode 20 provided in the upper side than the water surface, at a closed state, and the second case 40 forms a part of the first case 10.

For example, the second case 40 is formed of polycarbonate (PC) having a thickness of 3 mm the same as a thickness of the first case 10, and formed in a shape of cylinder in which a height thereof is 10 mm, an inner diameter thereof is 35 mm, and an upper surface thereof and a lower surface thereof are open. An upper end of the cylinder is sealed with an upper cover 41 so as to support the high-voltage electrode 20. The upper cover 41 may form a part of an upper surface 11 of the first case 10.

The high-voltage electrode 20 is installed on the upper cover 41 such that the tip of the high-voltage electrode 20 is placed inside the second case 40 and an upper end of the second case 40 is connected to a tab 12.

According to an embodiment, the upper cover 41 of the second case 40 is configured to form a part of the upper surface 11 of the first case 10, but is not limited thereto.

For example, the first case 10 and the second case 40 may have a rectangular parallelepiped shape and at least one surface of the second case 40 may form a part of at least one surface of the first case 10 such as one side surface of the second case 40 may form a part of one side surface of the first case 10.

Alternatively, the second case 40 may be fixed to the first case 10. According to an embodiment, the second case 40 is provided as an example of a partial case, wherein the partial case is installed inside the case and fixed to the case and when water to be treated is stored in the case, the partial case is changed into the closed state by the water surface of the water to be treated.

For example, the amount of water to be treated contained in the first case 10 may be 0.1 L. Although not shown in FIGS. 6A and 6B, a water inlet configured to supply water to be treated and a water outlet configured to discharge water to be treated may be installed in the first case 10.

When the first case 10 is filled with water to be treated and the voltage is applied between the high voltage electrode 20 and the ground electrode 30, the discharge may occur between the high voltage electrode 20 and the surface of the water by the plasma, and thus hydrogen peroxide is generated in the water to be treated.

In addition, the features described with reference to FIGS. 2 to 4, and the method of generating hydrogen peroxide described in various other embodiments are also applied to this embodiment, and thus description thereof is omitted.

Figure 7:
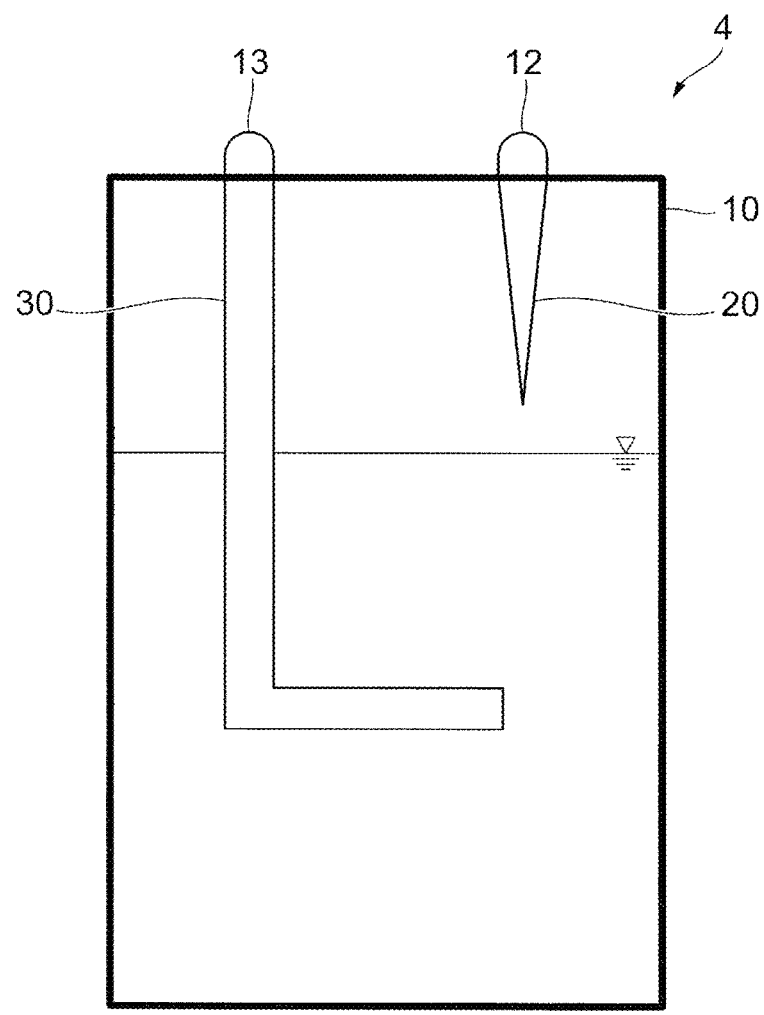
FIG. 7 is a view schematically illustrating a plasma generator according to an embodiment.

FIG. 7 is a view schematically illustrating a plasma generator 4 according to an embodiment.

As illustrated in FIG. 7, the plasma generator 4 includes a case 10, a high-voltage electrode 20 and a ground electrode 30.

The case 10 is formed in a cylindrical shape. For example, the case 10 is formed of a polyethylene terephthalate (PET) material having a thickness of 0.5 mm.

For example, the high voltage electrode 20 and the ground electrode 30 are formed of SUS304 and manufactured by processing a plate having a thickness of 0.1 mm.

A tip of the high-voltage electrode 20 is polished in the shape of a needle as various other embodiments.

For example, the high voltage electrode 20 and the ground electrode 30 may be formed of a material such as iron, stainless steel, or platinum.

According to various embodiments, a structure corresponding to the second case 40 for sealing the high-voltage electrode 20 is not provided, which is different from various other embodiments. Therefore, the water surface, which is formed by the case 10 itself and the water to be treated, maintains the high-voltage electrode 20 at the closed state.

According to an embodiment, since the ground electrode 30 is not provided on the lower surface of the case 10, gas generated in the ground electrode 30 may flow into a space in which the high voltage electrode 20 is closed. However, when hydrogen peroxide having a low concentration is needed, it may be possible to acquire hydrogen peroxide having a low concentration by applying various other embodiments.

For example, the amount of water to be treated contained in the first case 10 may be 0.25 L. Although not shown in FIG. 7, a water inlet configured to supply water to be treated and a water outlet configured to discharge water to be treated may be installed in the first case 10.

A process of generating hydrogen peroxide by using the above mentioned plasma generator 4 is performed in the same conditions as various other embodiments, except that the discharge time is 0.5 hour.

When measuring a concentration of hydrogen peroxide in the water to be treated by using pack test of Kyoritsurikagaku, it is confirmed that the concentration of hydrogen peroxide is 20 to 35 ppm.

In addition, the first case 10 is fixed to a vibrator (e.g., a VORTEX-GENIE2 ® manufactured by scientific industry, Inc.) and a vibration corresponding to plasma generator 3 or 4 is applied for one hour while the current is supplied with the above mentioned conditions.

It is confirmed that the discharge occurs by the plasma on the water while the voltage is applied.

In this case, the surface of the water is largely waved by the vibration, but the vibration is not stopped for 0.5 hour.

When measuring a concentration of hydrogen peroxide in the water to be treated by using pack test of Kyoritsurikagaku, it is confirmed that the concentration of hydrogen peroxide is 20 to 35 ppm.

That is, it is confirmed that the same amount of hydrogen peroxide is generated as that in the state in which the vibration is not applied.

Figure 8A:
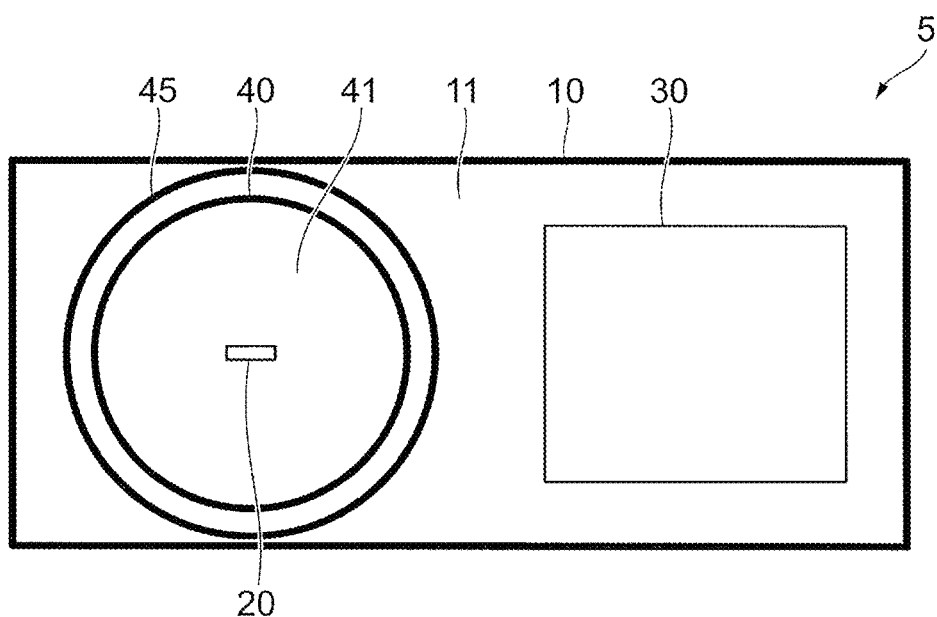
FIGS. 8A and 8B are views schematically illustrating a plasma generator according to an embodiment.
Figure 8B:
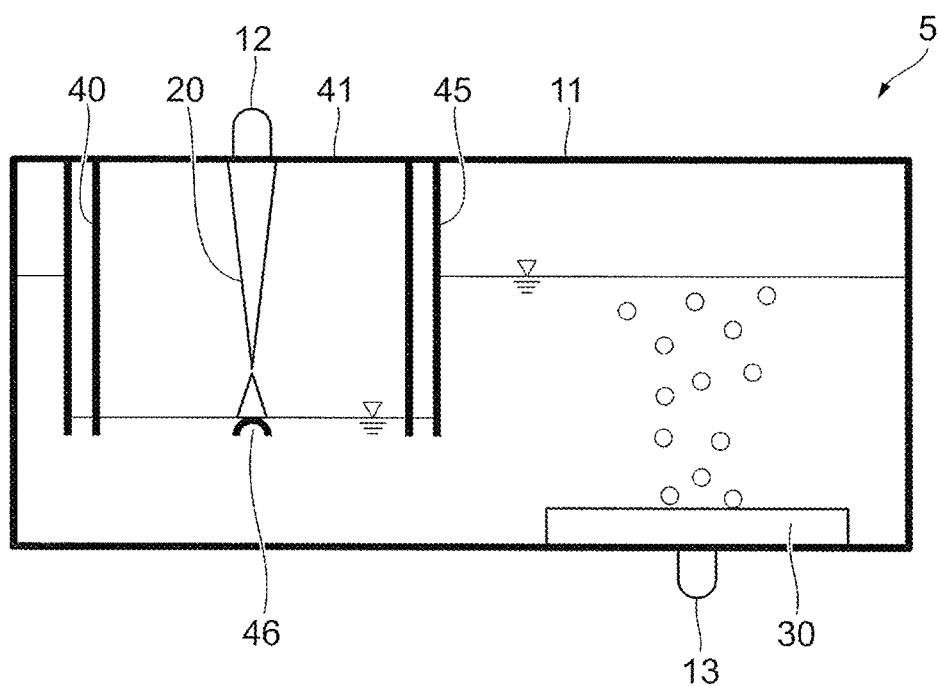

FIGS. 8A and 8B are views schematically illustrating a plasma generator 5 according to an embodiment. FIG. 8A is a top view of the plasma generator 5, and FIG. 8B is a cross-sectional view of the plasma generator 5.

As illustrated in FIGS. 8A and 8B, the plasma generator 5 includes a first case 10, a high-voltage electrode 20, a ground electrode 30, a second case 40, and an outer case 45.

The first case 10 may be formed of transparent polycarbonate (PC) having a thickness of 3 mm.

The high-voltage electrode 20 may be formed of SUS304. Particularly, the high-voltage electrode 20 is formed in a wedge shape with a thickness of 0.3 mm and a tip thereof is formed in a needle shape for a stable discharge.

The ground electrode 30 may be formed of SUS304. Particularly, the ground electrode 30 is formed in a plane mesh having a size of 40 mm×40 mm and a thickness of 0.2 mm.

The high voltage electrode 20 and the ground electrode 30 may be formed of a material such as iron, stainless steel, or platinum.

The second case 40 corresponds to a case configured to maintain the high-voltage electrode 20 provided in the upper side than the water surface, at a closed state, and the second case 40 forms a part of the first case 10.

For example, the second case 40 is formed of polycarbonate (PC) having a thickness of 3 mm the same as a thickness of the first case 10, and formed in a shape of cylinder in which a height thereof is 10 mm, an inner diameter thereof is 35 mm, and an upper surface thereof and a lower surface thereof are open. An upper end of the cylinder is sealed with an upper cover 41 so as to support the high-voltage electrode 20. The upper cover 41 may form a part of an upper surface 11 of the first case 10.

The high-voltage electrode 20 is installed on the upper cover 41 such that the tip of the high-voltage electrode 20 is placed inside the second case 40 and an upper end the second case 40 is connected to a tab 12.

According to an embodiment, the upper cover 41 of the second case 40 is configured to form a part of the upper surface 11 of the first case 10, but is not limited thereto.

For example, the first case 10 and the second case 40 may have a rectangular parallelepiped shape and at least one surface of the second case 40 may form a part of at least one surface of the first case 10 such as one side surface of the second case 40 may form a part of one side surface of the first case 10.

Alternatively, the second case 40 may be fixed to the first case 10. According to an embodiment, the second case 40 is provided as an example of a partial case, wherein the partial case is installed inside the case and fixed to the case and when water to be treated is stored in the case, the partial case is changed into the closed state by the water surface of the water to be treated.

The outer case 45 is provided outside the second case 40 while being apart from the second case 40 with a constant distance.

For example, the outer case 45 is formed in a shape of cylinder in which an inner diameter thereof is 35 mm and a hole 46 having a height of 5 mm is provided on a lower portion thereof.

Figure 9:
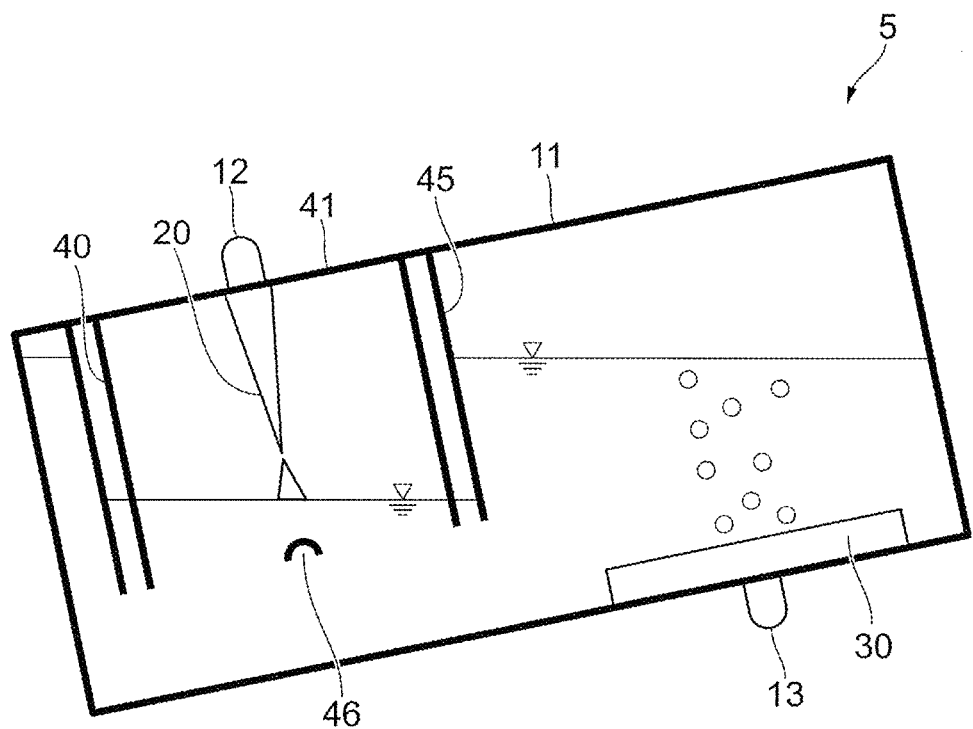
FIG. 9 is a view schematically illustrating a case in which the plasma generator according to an embodiment is disposed in at an inclination.

Strictly speaking, the hole 46 is supposed not be illustrated in the cross-sectional view since the hole 46 is installed in the front side of the outer case 45, but the hole 46 is illustrated in FIGS. 8B and 9 for convenience of description.

For example, the amount of water to be treated contained in the first case 10 may be 0.1 L. Although not shown in FIGS. 8A and 8B, a water inlet configured to supply water to be treated and a water outlet configured to discharge water to be treated may be installed in the first case 10.

When the first case 10 is filled with water to be treated and the voltage is applied between the high voltage electrode 20 and the ground electrode 30, the discharge may occur between the high voltage electrode 20 and the surface of the water by the plasma, and thus hydrogen peroxide is generated in the water to be treated.

FIG. 9 is a view schematically illustrating a case in which the plasma generator 5 according to an embodiment is disposed in at an inclination.

When the first case 10 is disposed in at an inclination, gas in the outer portion of the second case 40 is discharged to the outside through the hole 46 installed on the outer case 45.

When the second case 40 is disposed in at an inclination of 15° in a state in which the outer case 45 is not provided, gas in the second case 40 may be discharged to the outside, and water outside of the second case 40 may flow into the inside of the second case 40 and thus the water may be in contact with a first water surface (L1) of the high-voltage electrode 20.

As illustrated in FIG. 9, when the outer case 45 is provided, the gas in the outer portion of the second case 40 is firstly discharged to the outside through the hole 46 installed on the outer case 45 and thus it is difficult to discharge gas in the second case 40 to the outside. Therefore, it is difficult to flow the water outside of the second case 40 to the inside of the second case 40. Accordingly, although the first case 10 is disposed in at 15° to 20°, it is possible to maintain the distance between the high-voltage electrode 20 and the first water surface (L1).

Figure 10A:
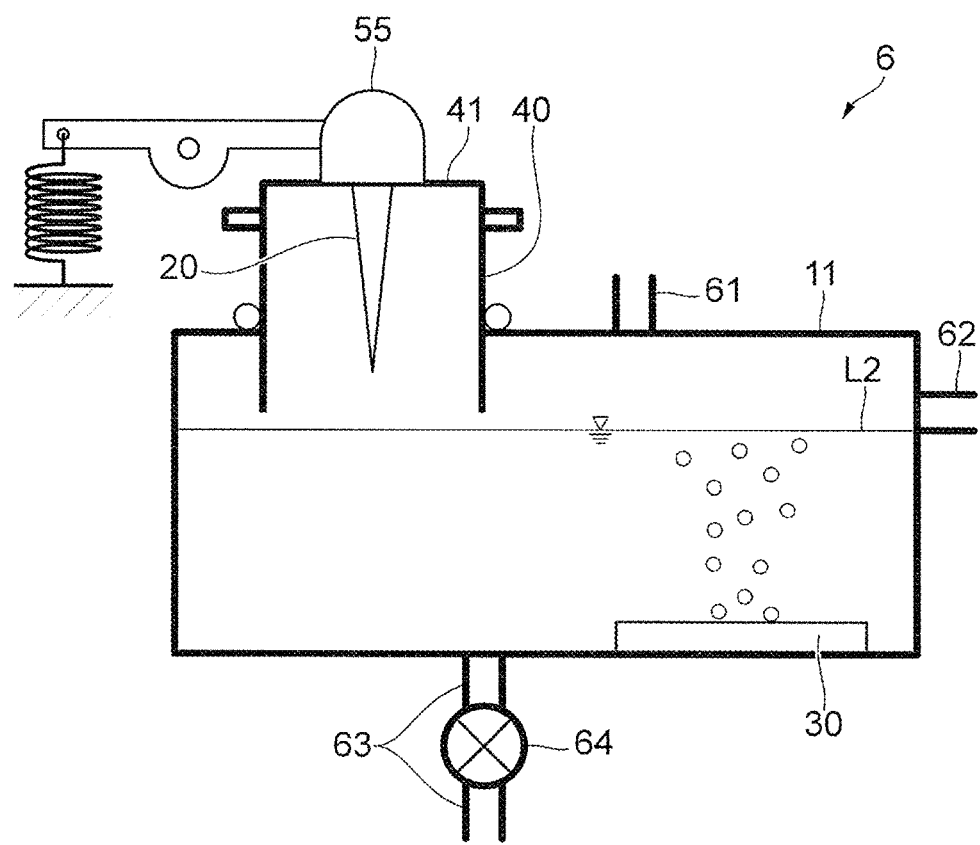
FIGS. 10A and 10B are views schematically illustrating a plasma generator according to an embodiment.
Figure 10B:
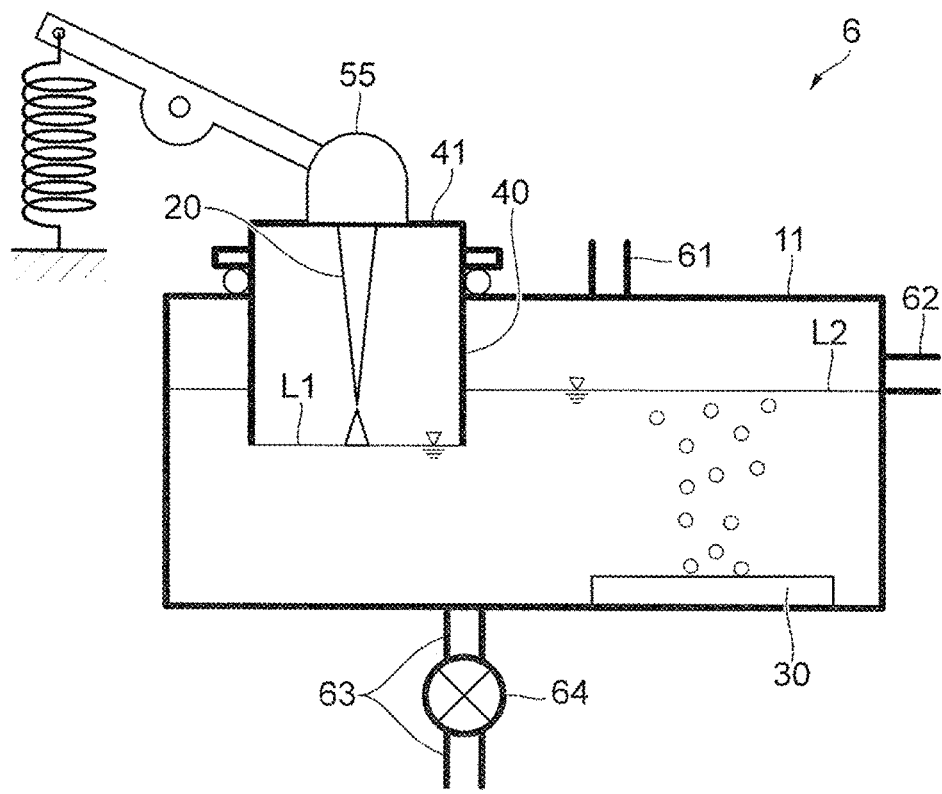

FIGS. 10A and 10B are views schematically illustrating a plasma generator 6 according to an embodiment.

As illustrated in FIGS. 10A and 10B, the plasma generator 6 includes a first case 10, a high-voltage electrode 20, a ground electrode 30, a second case 40, a solenoid 55, a water supply pipe 61, an overflow pipe 62, a discharge pipe 63, and a discharge valve 64.

The first case 10 may be formed of transparent polycarbonate (PC) having a thickness of 3 mm.

The high-voltage electrode 20 may be formed of SUS304. Particularly, the high-voltage electrode 20 is formed in a wedge shape with a thickness of 0.3 mm and a tip thereof is formed in a needle shape for a stable discharge.

The ground electrode 30 may be formed of SUS304. Particularly, the ground electrode 30 is formed in a plane mesh having a size of 40 mm×40 mm and a thickness of 0.2 mm.

In addition, the high voltage electrode 20 and the ground electrode 30 may be formed of a material such as iron, stainless steel, or platinum.

The second case 40 corresponds to a case configured to maintain the high-voltage electrode 20 provided in the upper side than the water surface, at a closed state, and the second case 40 forms a part of the first case 10.

For example, the second case 40 is formed of polycarbonate (PC) having a thickness of 3 mm the same as a thickness of the first case 10, and formed in a shape of cylinder in which a height thereof is 10 mm, an inner diameter thereof is 35 mm, and an upper surface thereof and a lower surface thereof are open. An upper end of the cylinder is sealed with an upper cover 41 so as to support the high-voltage electrode 20.

In a state in which the upper cover 41 is configured to cover a part of the upper surface 11 of the first case 10, as in various embodiments, when a pressure of the water flowing into the first case 10 is high, the water may flow into the second case 40.

Therefore, according to an embodiment, when the second case 40 is movable in a height direction (vertical direction), the second case 40 may be moved to the inside of the first case 10 after water is supplied to the first case 10.

That is, the second case 40 is configured to be movable between a first position and a second position, wherein the first position is a position in which the second case 40 is not immersed in the water contained in the first case 10 and the second position is a position in which the second case 40 is immersed in the water contained in the first case 10.

Particularly, the position of the second case 40 may be changed in the height direction (vertical direction) depending on turning on and off of the solenoid 55.

As illustrated in FIG. 10A, when the solenoid 55 is turned off that is when the second case 40 floats on the water surface of the first case 10, the water to be treated is supplied to the inside of the first case 10.

As illustrated in FIG. 10B, the second case 40 is immersed in the water to be treated and stored in the first case 10, by turning on the solenoid 55 and thus the first water surface (L1) is formed.

In this state, it is possible to adjust the position of the high-voltage electrode 20 so that the distance between the high-voltage electrode 20 and the first water surface (L1) becomes 3 mm.

The water supply pipe 61 is provided on the upper surface of the first case 10 and configured to supply the water to be treated by a predetermined amount in a state in which the discharge valve 64 is closed.

The overflow pipe 62 is provided on the side surface of the first case 10 and configured to adjust a second water surface (L2) of the first case 10 at a constant water level by discharging the water to be treated at the same water level as the overflow pipe 62 in a state in which the discharge valve 64 is closed.

The discharge pipe 63 is provided on the lower surface of the first case 10, and configured to discharge the water to be treated containing hydrogen peroxide to the outside of the first case 10.

The discharge valve 64 discharges the water to be treated to the outside in an open state and prevents the water to be treated from being discharged to the outside in a closed state. For example, the discharge valve 64 is opened to discharge the water to be treated containing hydrogen peroxide so as to prevent the water to be treated from freezing due to a temperature around the first case 10.

For example, the amount of water to be treated contained in the first case 10 may be 0.1 L.

When the first case 10 is filled with water to be treated and the voltage is applied between the high voltage electrode 20 and the ground electrode 30, the discharge may occur between the high voltage electrode 20 and the surface of the water by the plasma, and thus hydrogen peroxide is generated in the water to be treated.

In addition, the features described with reference to FIGS. 2 to 4, and the method of generating hydrogen peroxide described in various other embodiments are also applied to various other embodiments, and thus description thereof is omitted.

Figure 11A:
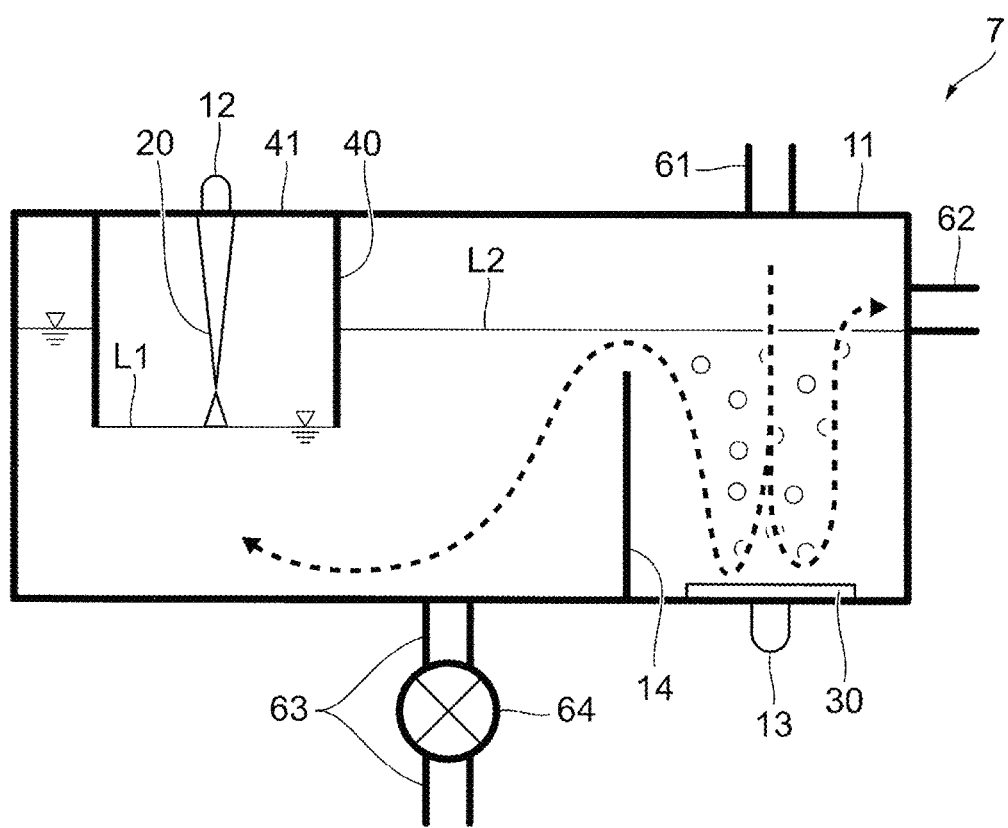
FIGS. 11A and 11B are views schematically illustrating a plasma generator according to an embodiment.
Figure 11B:
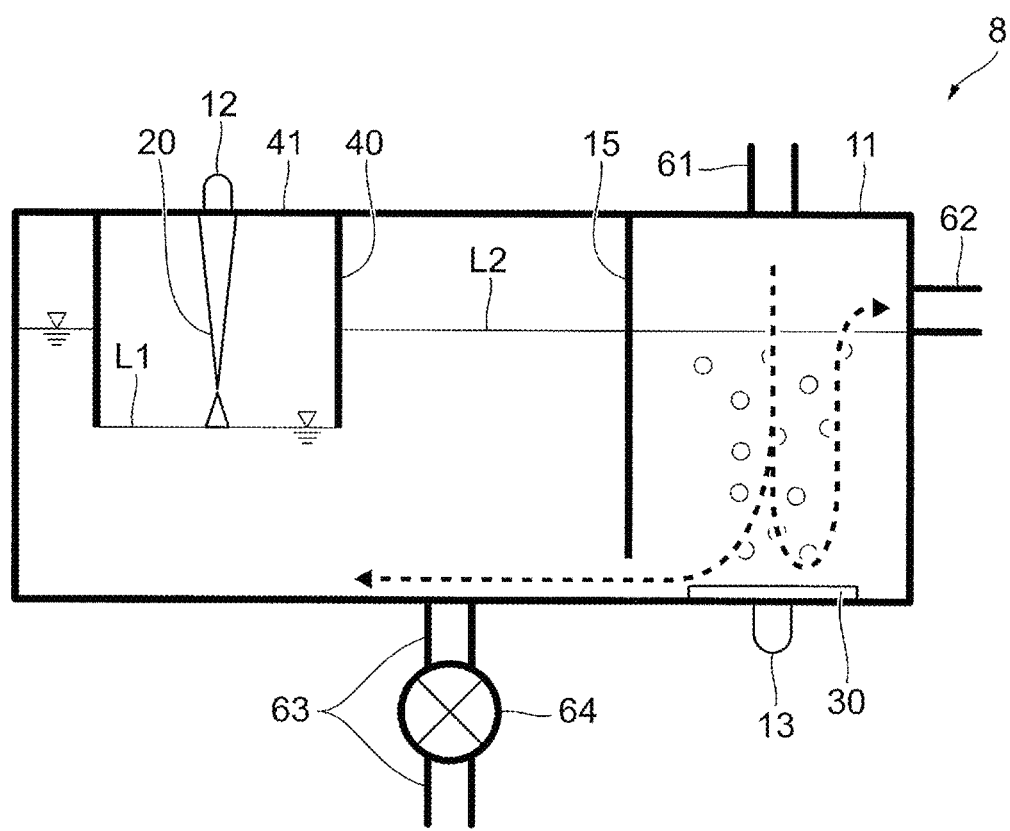

FIGS. 11A and 11B are views schematically illustrating plasma generators 7 and 8 according to an embodiment.

For example, when a large amount of water is supplied from the water supply pipe 61 in various embodiments, the large amount of water may flow into the second case 40 and thus the plasma discharge may not occur since the water surface is in contact with the high-voltage electrode 20.

According to an embodiment, it is possible to stably maintain a distance between the water surface and the high-voltage electrode 20 by using a rib.

As illustrated in FIG. 11A, the plasma generator 7 includes a first case 10, a rib 14, a high-voltage electrode 20, a ground electrode 30, a second case 40, a water supply pipe 61, an overflow pipe 62, a discharge pipe 63, and a discharge valve 64.

The rib 14 is provided on the lower surface of the first case 10. In this case, the water supplied from the water supply pipe 61 is moved to the lower side of the second case 40 by flowing over the upper end of the rib 14, as illustrated in broken lines of FIG. 11A.

As illustrated in FIG. 11B, a plasma generator 8 includes a first case 10, a rib 15, a high-voltage electrode 20, a ground electrode 30, a second case 40, a water supply pipe 61, an overflow pipe 62, a discharge pipe 63, and a discharge valve 64.

The rib 15 is provided on the upper surface of the first case 10. In this case, the water supplied from the water supply pipe 61 is moved to the lower side of the second case 40 by flowing over the lower end of the rib 15, as illustrated in broken lines of FIG. 11B.

According to an embodiment, water is prevented from flowing into the second case 40 by using the ribs 14 and 15 installed in the first case 10. The ribs 14 and 15 maintain the distance between the water surface and the high-voltage electrode 20 by adjusting the amount of the water. Therefore, the ribs 14 and 15 may allow the plasma discharge to stably occur between the water surface and the high-voltage electrode 20.

When the amount of water supplied from the water supply pipe 61 is equal to or less than 20 L per minute, the distance between the water surface and the high-voltage electrode 20 may be stably maintained without the ribs 14 and 15.

In this case, not only the cost for installing the ribs 14 and 15 may be reduced, but also the fluctuation of the concentration of the hydrogen peroxide generated in the water to be treated according to the discharge of plasma may be eliminated. Therefore, it is possible to maintain the constant concentration.

The first case 10 may be formed of transparent polycarbonate (PC) having a thickness of 3 mm.

The high-voltage electrode 20 may be formed of SUS304. Particularly, the high-voltage electrode 20 is formed in a wedge shape with a thickness of 0.3 mm and a tip thereof is formed in a needle shape for a stable discharge.

The ground electrode 30 may be formed of SUS304. Particularly, the ground electrode 30 is formed in a long rod shape in the vertical direction The high voltage electrode 20 and the ground electrode 30 may be formed of a material such as iron, stainless steel, or platinum.

The second case 40 corresponds to a case configured to maintain the high-voltage electrode 20 provided in the upper side than the water surface, at a closed state, and the second case 40 forms a part of the first case 10.

For example, the second case 40 is formed of polycarbonate (PC) having a thickness of 3 mm the same as a thickness of the first case 10, and formed in a shape of cylinder in which a height thereof is 10 mm, an inner diameter thereof is 35 mm, and an upper surface thereof and a lower surface thereof are open. An upper end of the cylinder is sealed with an upper cover 41 so as to support the high-voltage electrode 20. The upper cover 41 may form a part of an upper surface 11 of the first case 10.

The high-voltage electrode 20 is installed on the upper cover 41 such that the tip of the high-voltage electrode 20 is placed inside the second case 40 and an upper end the second case 40 is connected to a tab 12.

According to an embodiment, the upper cover 41 of the second case 40 is configured to form a part of the upper surface 11 of the first case 10, but is not limited thereto.

For example, the first case 10 and the second case 40 may have a rectangular parallelepiped shape and at least one surface of the second case 40 may form a part of at least one surface of the first case 10 such as one side surface of the second case 40 may form a part of one side surface of the first case 10.

Alternatively, the second case 40 may be fixed to the first case 10. According to an embodiment, the second case 40 is provided as an example of a partial case, wherein the partial case is installed inside the case and fixed to the case and when water to be treated is stored in the case, the partial case is changed into the closed state by the water surface of the water to be treated.

For example, the amount of water to be treated contained in the first case 10 may be 0.1 L.

When the first case 10 is filled with water to be treated and the voltage is applied between the high voltage electrode 20 and the ground electrode 30, the discharge may occur between the high voltage electrode 20 and the surface of the water by the plasma, and thus hydrogen peroxide is generated in the water to be treated.

In addition, the features described with reference to FIGS. 2 to 4, and the method of generating hydrogen peroxide described in various other embodiments are also applied to this embodiment, and thus description thereof is omitted.

Hereinafter an embodiment in which the plasma generator 2 according to various embodiments is installed in home appliances, will be described. A washing machine, a dish washer, and an air conditioner will be described as an example of the home appliances, but is not limited to thereto.

Alternatively, instead of the plasma generator 2 according to various embodiments, it may be possible to install the plasma generator 3 according to various other embodiments or the plasma generator 5 according to various other embodiments in the home appliances when the plasma generator 3 and the plasma generator 5 are provided with the water supply pipe 61, the overflow pipe 62, the discharge pipe 63, and the discharge valve 64. In addition, it may be possible to install the plasma generator 6 according to various other embodiments or the plasma generators 7a and 7b according to various other embodiments in the home appliances.

Figure 12:
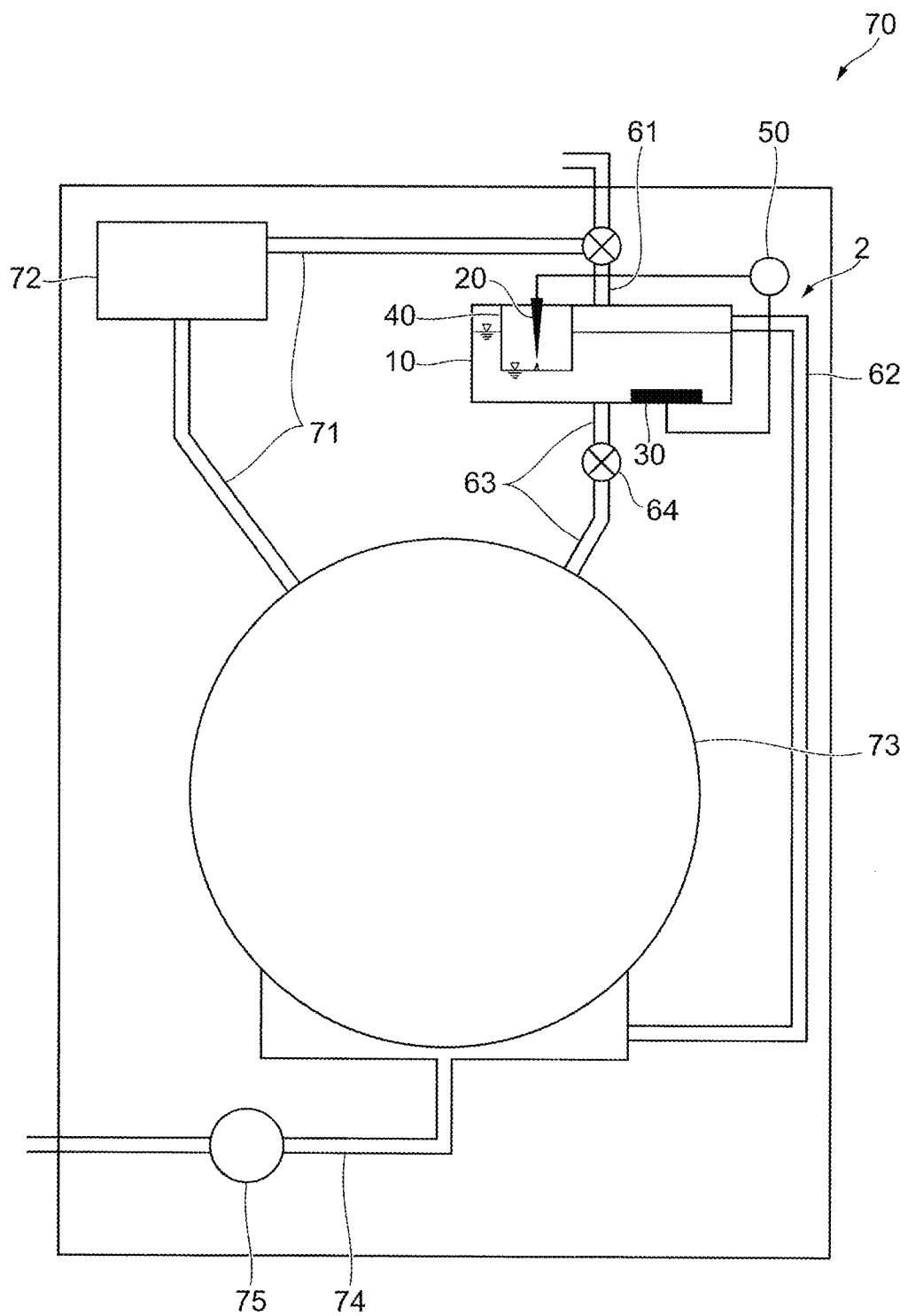
FIG. 12 is a view illustrating a washing machine in which the plasma generator according to an embodiment is installed.

FIG. 12 is a view illustrating a washing machine 70 in which the plasma generator 2 according to various embodiments is installed.

As illustrated in FIG. 12, the washing machine 70 is provided with the plasma generator 2, a water supply pipe 71 supplying washing water to be used for washing clothes, a detergent case 72 supplying detergent to the washing water supplied through the water supply pipe 71, a washing tub 73 storing the washing water supplied through the water supply pipe 71, and a discharge pipe 74 and a discharge pump 75 discharging water already used for the laundry to the outside.

The water supply pipe 71, which is configured to transmit water supplied from a tap to the detergent case 72, is branched and then connected to the water supply pipe 61 of the plasma generator 2.

The water passing through the water supply pipe 61 flows into the first case 10 of the plasma generator 2.

Water exceeding a predetermined amount is discharged to the washing tub 73 through the overflow pipe 62.

The hydrogen peroxide, which is generated by generating the plasma for a predetermined period of time in the plasma generator 2, is supplied to the washing tub 73 from the discharge pipe 63 when the discharge valve 64 provided in the lower portion of the first case 10 is opened. Accordingly, the clothes, the washing tub 73 and the discharge pipe 74 may be sterilized and cleaned by the generated hydrogen peroxide.

According to an embodiment, the washing tub 73 and the washing tub 73 may correspond to a component that is needed to be sterilized and cleaned, and the discharge pipe 63 may correspond to a pipe transmitting water to be treated containing the hydrogen peroxide, to components.

Figure 13:
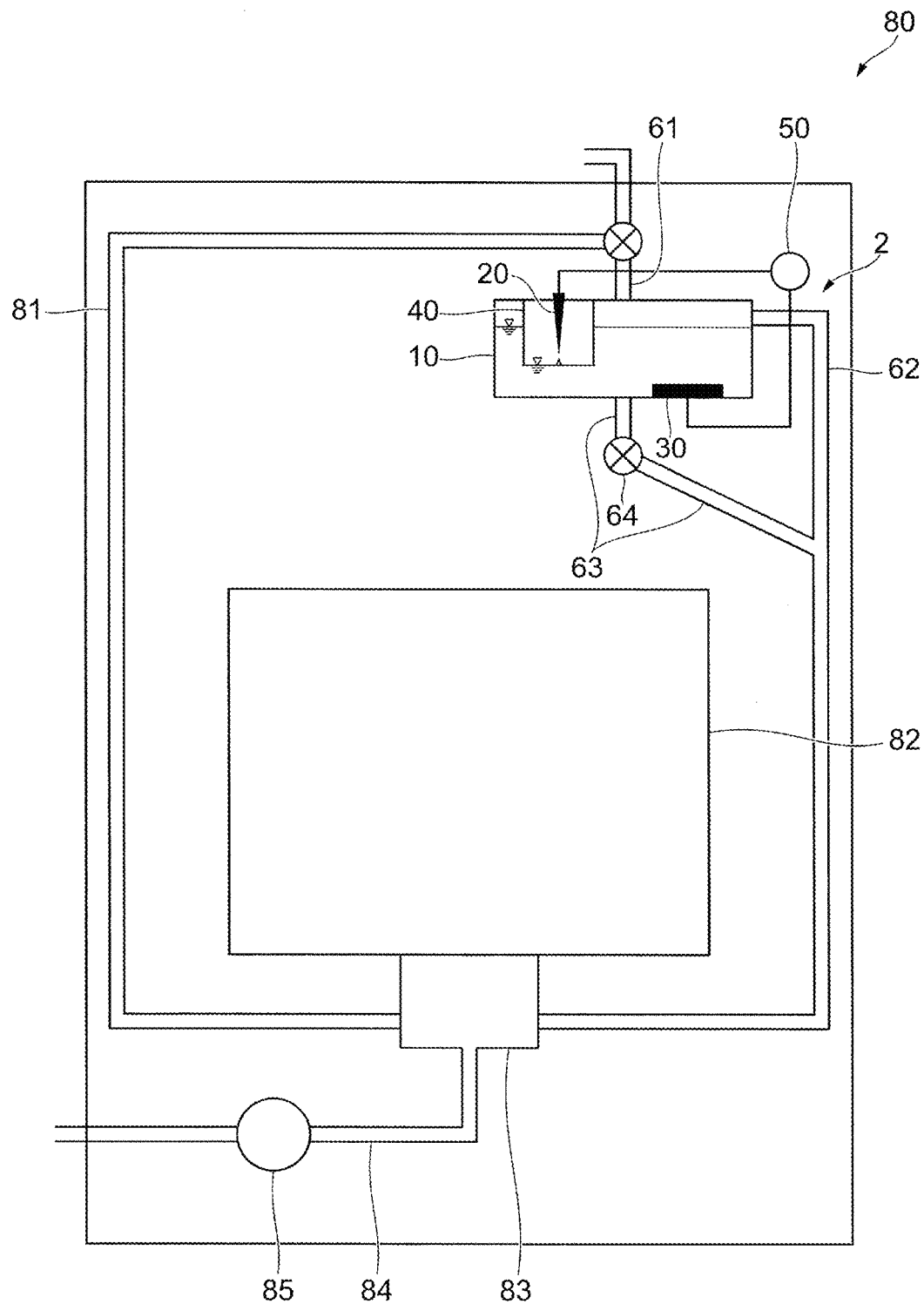
FIG. 13 is a view illustrating a dish washer in which the plasma generator according to an embodiment is installed.

FIG. 13 is a view illustrating a dish washer 80 in which the plasma generator 2 according to various embodiments is installed.

As illustrated in FIG. 13, the dish washer 80 is provided with the plasma generator 2, a water supply pipe 81 supplying washing water to be used for washing dishes, a washing tub 82 storing dishes, a sump 83 storing washing water supplied from the water supply pipe 81, and a discharge pipe 84 and a discharge pump 85 discharging water already used for the washing to the outside.

The water supply pipe 81, which is configured to transmit water supplied from a tap to the sump 83, is branched and then connected to the water supply pipe 61 of the plasma generator 2.

The water passing through the water supply pipe 61 flows into the first case 10 of the plasma generator 2.

Water exceeding a predetermined amount is discharged to the sump 83 through the overflow pipe 62.

The hydrogen peroxide, which is generated by generating the plasma for a predetermined period of time in the plasma generator 2, is supplied to the sump 83 from the discharge pipe 63 when the discharge valve 64 provided in the lower portion of the first case 10 is opened. Accordingly, the dishes, the washing tub 82, the sump 83 and the discharge pipe 84 may be sterilized and cleaned by the generated hydrogen peroxide.

Figure 14:
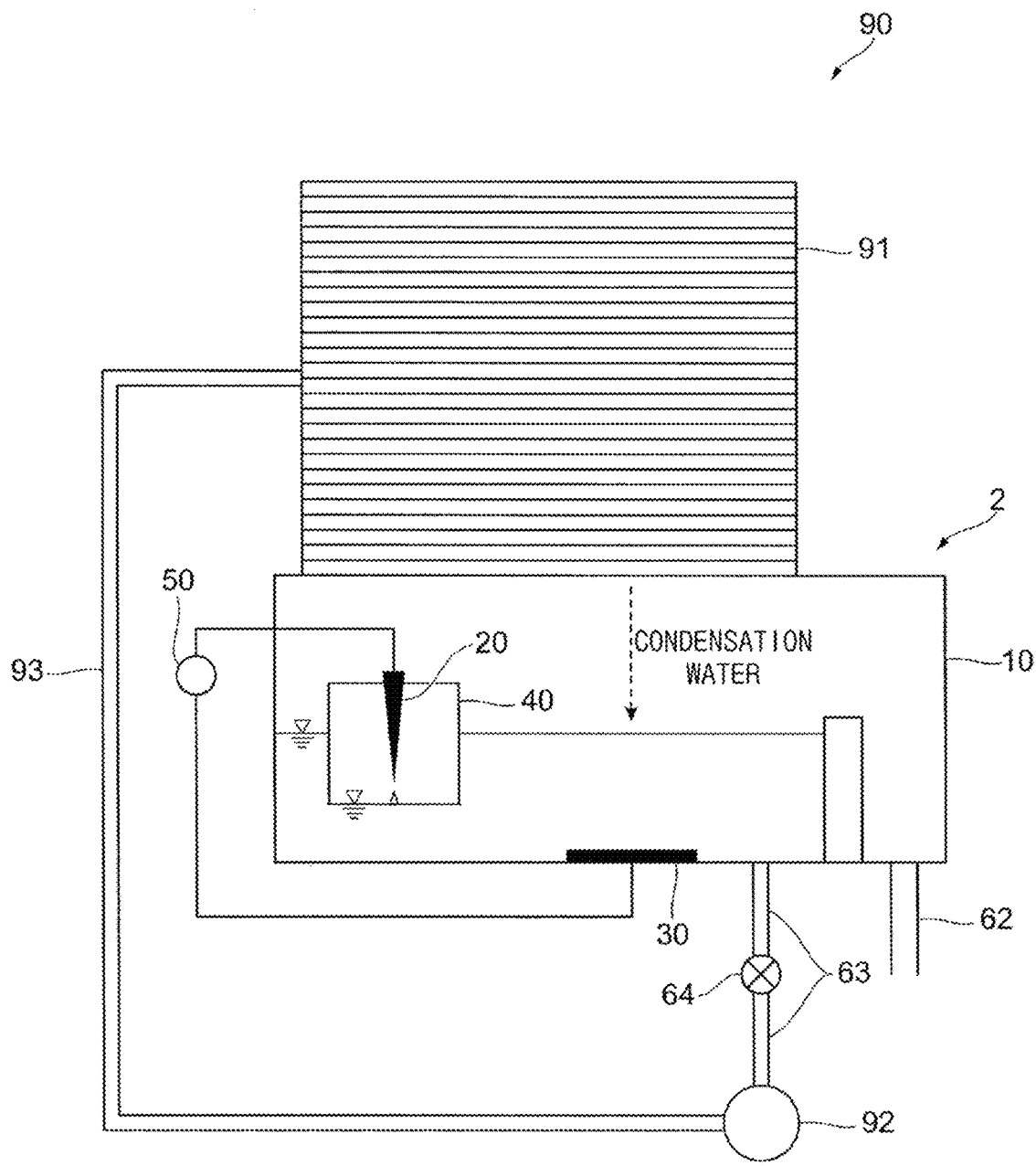
FIG. 14 is a view illustrating a heat exchanger unit of an air conditioner in which the plasma generator according to an embodiment is installed.

That is, according to an embodiment, the washing tub 82, the sump 83 and the discharge pipe 84 may correspond to a component that is needed to be sterilized and cleaned and the discharge pipe 63 may correspond to a pipe transmitting water to be treated containing the hydrogen peroxide, to components FIG. 14 is a view illustrating a heat exchanger unit 90 of an air conditioner in which the plasma generator 2 according to various embodiments is installed.

As illustrated in FIG. 14, the heat exchanger unit 90 is provided with the plasma generator 2, a heat exchanger 91 exchanging heat between air and refrigerant, a circulation pump 92 circulating water discharged from the plasma generator 2, and a pipe 93 transmitting the circulated water to the heat exchanger 91.

However, as for the plasma generator 2, the upper surface of the first case 10 is not integrally formed with the upper surface of the second case 40, but the second case 40 is fixed to the side surface with respect to the front side of the drawing of the first case 10 and fixed to the side surface of the inner side of the drawing of the first case 10.

In addition, the plasma generator 2 is not provided with the water supply pipe 61, and the overflow pipe 62 is installed on the lower surface of the first case 10.

During the cooling, condensation water of the heat exchanger 91 flows into the first case 10 of the plasma generator 2.

Water exceeding a predetermined amount is discharged through the overflow pipe 62.

The hydrogen peroxide, which is generated by generating the plasma for a predetermined period of time in the plasma generator 2, is supplied from the discharge pipe 63 when the discharge valve 64 provided in the lower portion of the first case 10 is opened. The hydrogen peroxide discharged from the discharge pipe 63 is pumped by the circulation pump 92 and then flows into the heat exchanger 91 through the pipe 93. Accordingly, the heat exchanger 91 may be sterilized and cleaned by the generated hydrogen peroxide.

That is, according to an embodiment, the heat exchanger 91 may correspond to a component that is needed to be sterilized and cleaned and the discharge pipe 63 and the pipe 93 may correspond to a pipe transmitting water to be treated containing the hydrogen peroxide, to components.

According to various embodiments, it is possible to allow the space around the high-voltage electrode to be a closed space by the water surface formed by a part of the case and water to be treated.

Accordingly, since the volume of the gas in the closed space is kept constant, it is possible to maintain the distance between the high voltage electrode and the water surface and thus it is possible to stably maintain the discharge state.

It is possible to adjust a relative position of the high-voltage electrode and a relative position of the ground electrode to prevent gas, which is generated from the ground electrode, from flowing into the closed space.

Accordingly, the volume of the gas in the closed space is kept constant and thus it is possible to stably maintain the discharge state.

As for gas generated from the ground electrode, hydrogen is generated by an electrochemical reaction as the amount of flowing current is increased, and thus a temperature thereof is increased due to the heat generation and steam may be generated in the form of small bubbles.

According to various embodiments, it is possible to set the distance between the high-voltage electrode and the water surface to be 1 mm to 5 mm. Therefore, the stable discharge occurs and thus it is possible to secure the amount of the generated hydrogen peroxide.

When the distance between the high-voltage electrode and the water surface is less than 1 mm, the water surface may be in contact with the tip of the high-voltage electrode due to the change of the water surface, and when the water surface is in contact with the tip of the high-voltage electrode, the discharge may be stopped and the tip of the electrode may be degraded.

When the distance between the high-voltage electrode and the water surface is greater than 5 mm, the discharge may not occur or the amount of the generated hydrogen peroxide may be reduced although the voltage is applied.

As is apparent from the above description, the plasma generator stably performs the discharge although the plasma generator is vibrated, wherein the plasma generator is configured to generate the discharge by plasma.

Although the present disclosure has been described with various embodiments, various changes and modifications may be suggested to one skilled in the art. It is intended that the present disclosure encompass such changes and modifications as fall within the scope of the appended claims.

What is claimed is:

1. A plasma generator comprising:
   a first case configured to store water to be treated;
   a second case disposed inside the first case and including a body comprising first and second opposite sides that are open;
   a cover sealing the first open side of the body in a manner to create a closed space of gas inside the second case when the first case is filled with the water to be treated;
   a first electrode disposed in a manner that at least a portion of the first electrode is immersed in the water to be treated; and
   a second electrode disposed on the cover inside the second case and apart from a water surface of the water to be treated at the second open side of the body due to the closed space of the second case.

2. The plasma generator of claim 1, wherein a height of a water surface of the water to be treated inside the body is lower than a height of a water surface of the water to be treated outside the body.

3. The plasma generator of claim 2, wherein an end of the second electrode is disposed lower than the water surface of the water to be treated outside the body.

4. The plasma generator of claim 1, wherein at least one portion of the second case is integrally formed with the first case.

5. The plasma generator of claim 4, wherein the cover of the second case is integrally formed with the first case.

6. The plasma generator of claim 4, wherein the body is integrally formed with the first case.

7. The plasma generator of claim 1, wherein the closed space is defined by the cover, the body, and the water surface of the water to be treated.

8. The plasma generator of claim 1, wherein the first electrode is disposed on a lower surface of the first case.

9. The plasma generator of claim 1, wherein the first electrode is disposed in a position that is not overlapped with the second case in a vertical direction.

10. The plasma generator of claim 1, wherein the first electrode comprises a long rod shape, is coupled to an upper surface of the first case, and extends in a vertical direction.

11. The plasma generator of claim 1, further comprising:
    a water supply pipe configured to supply water to be treated to the first case;

an overflow pipe configured to adjust a height of the water surface of the water to be treated stored in the first case;

a discharge pipe configured to discharge the water to be treated stored in the first case to an outside of the first case; and a discharge valve disposed on the discharge pipe to regulate the discharge of the water to be treated.

12. The plasma generator of claim 11, wherein the first case comprises at least one rib disposed between the water supply pipe and the second case.

13. The plasma generator of claim 12, wherein the at least one rib is extended from a lower surface of the first case to an upper side of the water surface of the water to be treated.

14. The plasma generator of claim 1, further comprising an outer case spaced apart from the body to an outside of the body.

15. The plasma generator of claim 1, wherein the second case is configured to move between:

a first position that is not immersed in the water to be treated stored in the first case, and a second position that is immersed in the water to be treated stored in the first case.

16. A home appliance comprising:

a treatment apparatus configured to form a treatment space therein to store water to be treated;

a plasma generator configured to generate hydrogen peroxide in the water to be treated by generating a discharge by plasma; and a pipe configured to guide the water to be treated containing hydrogen peroxide, to the treatment apparatus, wherein the plasma generator comprises:

a first case configured to store water to be treated;

a second case disposed inside the first case and including a body comprising first and second opposite side that are open;

a cover sealing the first open side of the body in a manner to create a closed space of gas inside the second case when the first case is filled with the water to be treated;

a first electrode disposed in a manner that at least a portion of the first electrode is immersed in the water to be treated stored in the first case; and a second electrode disposed on the cover inside the second case and configured to generate the discharge by the plasma between the second electrode and the water to be treated by being disposed at the second open side of the body due to the closed space of the second case.

17. The home appliance of claim 16, wherein a height of a water surface of the water to be treated in contact with a second open side of the body of the second case is lower than a height of a water surface of the water to be treated outside the body of the second case.

18. The home appliance of claim 16, wherein the second case is configured such that an inner space of the second case is closed by the water to be treated stored in the first case.

19. The home appliance of claim 16, wherein in the first case, the second electrode is disposed in an upper side of a water surface of the water to be treated in a higher position than the first electrode.

* * * * *